US011070677B1

(12) United States Patent
Pickett et al.

(10) Patent No.: US 11,070,677 B1
(45) Date of Patent: Jul. 20, 2021

(54) TECHNIQUES FOR MEDIA CALL MULTIWAY RELAY ESCALATION

(71) Applicant: FACEBOOK, INC., Menlo Park, CA (US)

(72) Inventors: Cameron James Pickett, Seattle, WA (US); Dwayne B Mercredi, Kirkland, WA (US); David Kawai Wong, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/197,104

(22) Filed: Nov. 20, 2018

(51) Int. Cl.
*H04M 3/56* (2006.01)
*H04L 29/08* (2006.01)

(52) U.S. Cl.
CPC ........ *H04M 3/561* (2013.01); *H04L 67/1046* (2013.01); *H04L 67/146* (2013.01); *H04L 67/148* (2013.01)

(58) Field of Classification Search
CPC .. H04M 3/561; H04L 67/1046; H04L 67/146; H04L 67/148
See application file for complete search history.

(56) References Cited

U.S. PATENT DOCUMENTS

2012/0054276 A1* 3/2012 Chaturvedi ......... H04L 67/1046
709/204
2018/0048621 A1* 2/2018 Yiu ...................... H04L 61/106

* cited by examiner

*Primary Examiner* — Marcos L Torres
(74) *Attorney, Agent, or Firm* — Kacvinsky Daisak Bluni PLLC

(57) ABSTRACT

Techniques to signal escalation of a peer-to-peer two-party media call to a multiway media call are described. An apparatus may comprise a communication client operative on caller and callee client devices. The communication client may comprise a user interface component to allow users of the device to initiate and take part in one-to-one and multiway calls; a network component operative to handle network communications between messaging servers and other client devices; a peer-to-peer media call component operative to perform peer-to-peer one-on-one media calls between client devices; a multiway media call component operative to join a multiway call at a multiway media relay system; and a media call management component operative to initiate the peer-to-peer media call, to detect a multiway media call escalation event and to transition the peer-to-peer media call to a multiway call session. Other embodiments are described and claimed.

13 Claims, 12 Drawing Sheets

600

Initiate a peer-to-peer two-party media call at a first client device with a second client device, wherein initiating the peer-to-peer two-party media call includes coordinating a multiway call identifier between the first client device and the second client device.
602

Perform the peer-to-peer two-party media call between the first client device and the second client device.
604

Detect a multiway media call escalation event associated with the peer-to-peer two-party media call at the first client device.
606

Join a multiway media call session at a multiway media relay system, wherein the multiway media call session is identified to the multiway media relay system based on the multiway call identifier coordinated while initiating the peer-to-peer two-party media call.
608

Transition the first client device from the peer-to-peer two-party media call to the multiway media call session.
610

```
┌─────────────────────────────────────────────┐
│ Receive, at a server, a P2P initiate        │
│ request from a first client device,         │
│ allocate a multiway call identifier and     │
│ forward the P2P initiate request,           │
│ including the multiway call identifier, to  │
│ a second client device                      │
│ 702                                         │
└─────────────────────────────────────────────┘
                      │
┌─────────────────────────────────────────────┐
│ Receive a multiway join request from a      │
│ client device, indicating that the call     │
│ will be escalated to a multiway call        │
│ 704                                         │
└─────────────────────────────────────────────┘
                      │
┌─────────────────────────────────────────────┐
│ Send multiway call escalation signal to     │
│ third party client device and receive a     │
│ multiway join request from the third        │
│ party client device.                        │
│ 706                                         │
└─────────────────────────────────────────────┘
                      │
┌─────────────────────────────────────────────┐
│ Receive an add participant request, ring    │
│ the client device specified in the add      │
│ participant request and receive a join      │
│ request from the added client device.       │
│ 708                                         │
└─────────────────────────────────────────────┘
                      │
┌─────────────────────────────────────────────┐
│ Send a participant update signal to all     │
│ participants in the mutltiway call,         │
│ informing them of the added participant.    │
│ 710                                         │
└─────────────────────────────────────────────┘
                      │
┌─────────────────────────────────────────────┐
│ Relay signals and media between all         │
│ participants in the multiway call.          │
│ 712                                         │
└─────────────────────────────────────────────┘
```

TECHNIQUES FOR MEDIA CALL MULTIWAY RELAY ESCALATION

BACKGROUND

Users of mobile devices, such as smartphones, may engage in voice or video calling with other users of smartphones. In some instances, these may be one-to-one calls, while in other instances multiple parties may engage in a common voice or video call. It is preferable, when engaging in one-to-one calls, that a peer-to-peer (P2P) mode of calling be utilized for call quality considerations. When in P2P mode, is desirable to be able to escalate the one-to-one call to a multiway call, which may include multiple third parties.

SUMMARY

The following presents a simplified summary to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to escalate a P2P mode call to a multiway mode call. Some embodiments are particularly directed to techniques to negotiate a conference name for a multiway call and to signal escalation from a P2P call to a multiway call. In one embodiment, for example, an apparatus may comprise a communication client operative on caller and callee client devices. The communication client may comprise a separate app installed on a mobile device or may comprise components built into the telephone or videoconferencing app of a mobile device.

The communication client may comprise a user interface component to allow users of the device to initiate and take part in one-to-one and multiway calls; a network component operative to handle network communications between messaging servers and other client devices; a P2P media call component operative to perform P2P two-party media calls between client devices; a multiway media call component operative to conduct a multiway call on a multiway media relay system; and a media call management component operative to initiate the P2P two-party media call, to detect a multiway media call escalation event and to transition the P2P two-party media call to a multiway call session. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for a client device in accordance with the claimed embodiments.
FIG. 7 illustrates an embodiment of a logic flow for a server device in accordance with the claimed embodiments.

DETAILED DESCRIPTION

Figure 1:
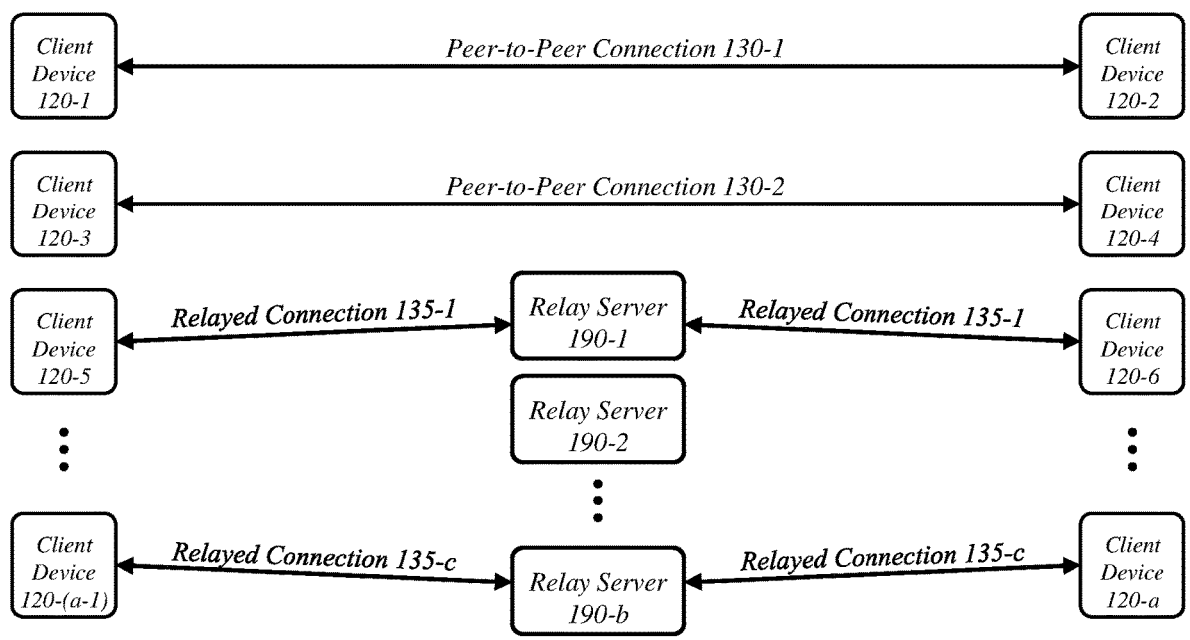
FIG. 1 illustrates an embodiment of a media call system.

As used herein, the term "legacy device" means a device having a communication client installed thereon, wherein the communication client does not support the escalation of a P2P call to a multiway call.

For client devices supporting multiway calling, multiway calls may be initiated in one of two ways. In a first embodiment, the multiway call may be initiated by either the caller device or the callee device after a P2P call has been established between the caller and the callee devices. In a second embodiment, the multiway call may be initiated prior to the P2P call being established between the caller device and a callee device, for example, wherein the caller device has added other parties to the call prior to the call being answered by the first callee device.

In the first embodiment, the call is initiated by the caller device and is directed to a specific callee device. The user at the caller device may initiate the call through a call initiation user interface by selecting the desired callee user from a contact list or by directly entering information identifying the callee, for example, a phone number or email address. A communication client on the caller device will send a P2P offer signal to a messaging server facilitating the initiation of the P2P call. The P2P offer signal may include a flag indicating that escalation from P2P calls to multiway calls is supported by the caller device. Additionally, the caller device may generate a multiway call identifier, which may also be included in the P2P offer signal.

The messaging server may receive the P2P offer signal and forward it to the callee device. If the caller device has already selected a multiway call identifier, the multiway call identifier would be included in the P2P offer signal sent to the callee device. In other embodiments, where the caller device has not specified a multiway call identifier, the messaging server may generate a multiway call identifier and include it in the P2P offer signal sent to the callee device.

Upon receipt of the P2P offer signal, the callee device will signal the user of the incoming call. In preferred embodiments the user may be signaled by providing an audio or tactile signal to the user within an incoming call user interface. When the user accepts, the callee device may transition to an in-call user interface for supporting P2P calls or for supporting both P2P and multiway calls. Because the caller device had signaled its capability for supporting escalation from P2P calls to multiway calls, the callee device is aware that the caller device is capable of multiway call support. As such, if the callee device is also capable of escalating from P2P mode calls to multiway mode calls, the in-call user interface may include a user control which, when activated, may escalate the call from a P2P call to a multiway call. In preferred embodiments, the user control may take the form of an "add participant" button which, when selected, would escalate the call to a multiway call and allow the user to add participants to the multiway call. The callee device then sends a P2P accept signal to the caller device, which may include a flag indicating that the callee device is capable of escalating a P2P call to a multiway call. Additionally, the accept signal may include the multiway call identifier.

After receiving the P2P accept signal from the callee device, the caller device may transition to an in-call user interface. Because the caller device supports escalating a P2P call to a multiway call and is aware that the callee device also supports escalating a P2P call to a multiway call, the caller device will include the user control previously described for escalating the call from a P2P call to a multiway call. In certain embodiments, if either the caller device or the callee device does not support escalating a P2P call to multiway call (i.e. is a legacy device), then the user control for escalating the call from a P2P call to a multiway call may not be displayed or may be displayed but disabled.

To escalate the call from a P2P call to a multiway call, the user at either the caller device or the callee device may select the user control displayed on the in-call user interface. As an example, assume device A and device B are engaged in a P2P call and that the user at device B selects the escalate user control. Upon selection of the user control, a multiway service join request is sent from device B to a multiway server in a multiway media relay system. In certain embodiments, the multiway service join request may include the identity of the other participant in the call (device A) as well as the identity of the new participant (device C) to be added to the call. Upon receipt of the multiway service join request, the multiway media relay system may ring device C and may send a P2P escalate signal to device A. The P2P escalate signal may include the conference name, and the identity of the escalating device, in this case device B.

Upon receipt of the P2P escalate signal, device A may detect that the conference name and the device indicated in the escalate signal match an ongoing P2P call and may transition to a multiway call mode. Device A may then send a multiway service join request to the multiway server and may receive a response from the multiway server indicating that it has been joined to the multiway call. Once the multiway call has been joined, the in-call two-party user interface on device A may transition to an in-call multiway user interface. When device C answers the ring, device C will be joined in the multiway call with devices A and B.

In certain embodiments, once the call has been escalated from a P2P call to multiway call, the user control on all participating devices may be removed or disabled. In other embodiments, the control may remain or be replaced by another control allowing the addition of more participants to the multiway call.

In a second embodiment of the invention, the call may be transitioned from a P2P call to multiway call prior to the P2P call being established by having the caller device select the user control or attempt to add additional devices to the call before the initial callee device answers the call.

As in the first embodiment, the caller device (device A) will send an offer signal to the messaging server which will, in turn, forward the P2P offer signal to the first callee device (device B). Prior to device B answering the call, the user at device A may attempt to add another device to the call by selecting the user control. At which point Device A will escalate to multiway call mode. Device A will then send a multiway service join request to a multiway media relay system. The multiway service join request may identify the device to be added to the multiway call. The multiway service join request may identify the multiway call using the multiway call identifier. The multiway server will then ring device C and will send a P2P escalate signal to device B (even though device B has not yet answered the call). Once a multiway call has been established, any participant may add new devices to the call by sending an add participant signal to the multiway server. Once an add participant signal has been received by the multiway server, a participant update signal will be sent to all participants of the call, including those that have not yet answered call, indicating that a new device has been added to the multiway call.

A participant in the call may attempt to add a legacy device (i.e. one that does not support escalating P2P to multiway calls) to the multiway call. Under these circumstances, the multiway media relay system may detect that the new participant device is a legacy device and will either refrain from sending a ring signal, or, in the event that a ring signal has already been sent, may send an abort signal to prevent the device from ringing or to stop the device from ringing.

A method in accordance with embodiments described herein includes initiating a P2P two-party media call from a first client device to a second client device, wherein the initiating includes coordinating a multiway call identifier between the first client device and the second client device; performing the P2P two-party call between the first client device and the second client device; detecting a multiway media call escalation event (i.e. selection of a user control) associated with the P2P two-party call; joining a multiway media call session at a multiway server, wherein the multiway call session is identified based on the multiway call identifier; and transitioning the first client device from P2P mode to multiway call mode.

The described embodiments can improve efficiency by establishing both P2P and multiway calls in P2P mode to avoid having to interact with the multiway media relay system while the calls remain in P2P mode and may improve the user experience by conducting all one-to-one calls in higher quality P2P mode and transitioning to a multiway service only after the user has indicated a desire to transition from a P2P call to a multiway call.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well known structures and devices are shown in block diagram form to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a media call system 100. In one embodiment, the media call system 100 may comprise a computer-implemented system having software applications comprising one or more components. Although the media call system 100 shown in FIG. 1 has a limited number of elements in a certain topology, it may be appreciated that the media call system 100 may include more or fewer elements in alternate topologies as desired for a given implementation.

A plurality of client devices 120 may operate as part of the media call system 100. The client devices 120 may execute media clients, wherein each of the client devices 120 and their respective media clients are associated with a particular user of the media call system 100. In some embodiments, the client devices 120 may be cellular devices such as smartphones and may be identified to the media call system 100 based on a phone number associated with each of the client devices 120. In some embodiments, the client devices 120 may be identified to the media call system 100 based on a user account registered with the media call system 100, and, potentially, a social networking system and/or messaging system that comprises or is associated with the media call system 100 and logged into from the media client executing on the client devices 120. In general, each media client may be addressed through various techniques for the reception of media and/or messages. While in some embodiments the client devices 120 may comprise cellular devices, in other embodiments one or more of the client devices 120 may include personal computers, tablet devices, any other form of computing device without limitation. Personal computers and other devices may access a media call system 100 using web browser accessing a web server, for instance.

Streaming network connections within the media call system 100 may be performed directly or via relay servers 190. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay server provided as part of the media call system 100, the relay server then forwarding the network packets to the destination client device. Relay servers 190 may be used, for instance, to bridge NAT devices that are not configured to sufficiently expose a destination client device for the performance of a direct connection.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface for empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Media call system 100 may include an authorization server (or other suitable component(s)) that allows users to opt in to or opt out of having their actions logged by media call system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, with whom information associated with the user may be shared, and for what purposes information associated with the user may be logged or shared. Authorization servers or other authorization components may be used to enforce one or more privacy settings of the users of media call system 100 and other elements of a messaging system through blocking, data hashing, anonymization, or other suitable techniques as appropriate. For instance, a user may be empowered to configure privacy settings determining whether network usage, such as streaming communication, is logged by the media call system 100 and analyzed. In some embodiments, a user may be presented with information regarding how the information may be used, such as informing the user that collected information may be anonymized prior to analysis.

Figure 2:
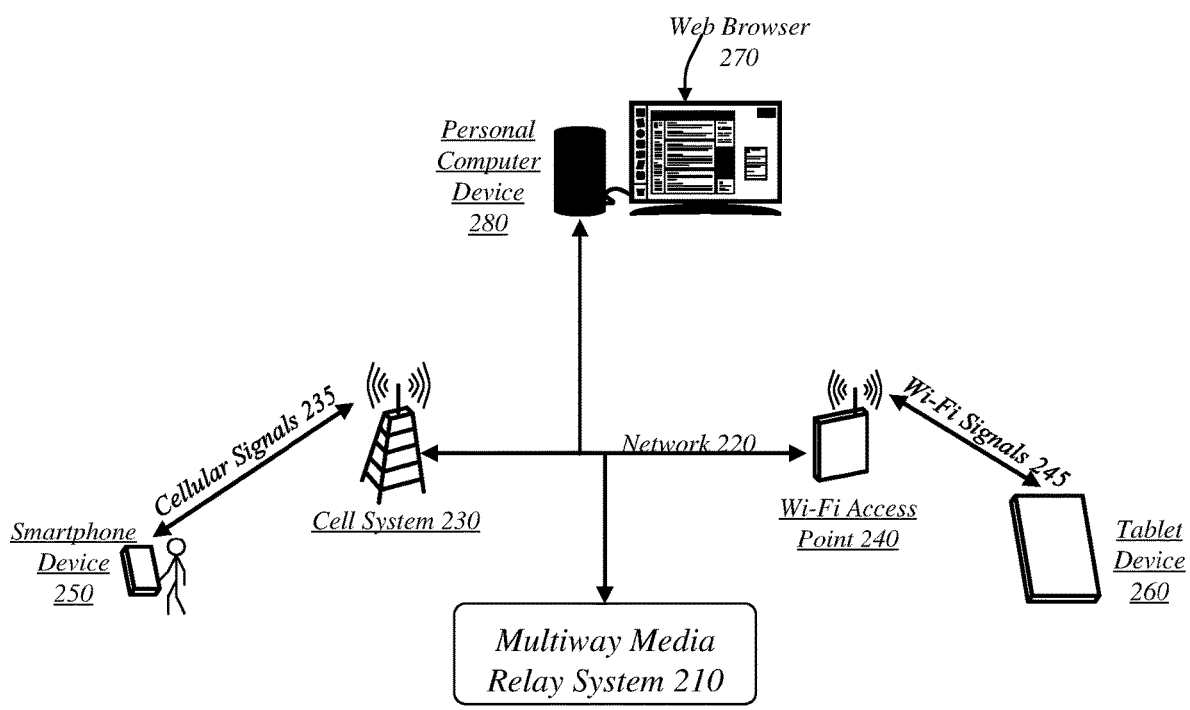
FIG. 2 illustrates a second embodiment of a media call system.

FIG. 2 illustrates a second embodiment of a media call system 100. The multiway media relay system 210 may comprise one or more relay servers 190 operated by a media call system 100.

A user may own and operate a smartphone device 250. The smartphone device 250 may comprise an iPhone® device, an Android® device, a Blackberry® device, or any other mobile computing device conforming to a smartphone form. The smartphone device 250 may be a cellular device capable of connecting to a network 220 via a cell system 230 using cellular signals 235. In some embodiments and in some cases the smartphone device 250 may additionally or alternatively use Wi-Fi or other networking technologies to connect to the network 220. The smartphone device 250 may execute a media client, messaging client, web browser, or other local application to access the multiway media relay system 210.

The same user may own and operate a tablet device 260. The tablet device 260 may comprise an iPad® device, an Android® tablet device, a Kindle Fire® device, or any other mobile computing device conforming to a tablet form. The tablet device 260 may be a Wi-Fi device capable of connecting to a network 220 via a Wi-Fi access point 140 using Wi-Fi signals 245. In some embodiments and in some cases the tablet device 260 may additionally or alternatively use cellular or other networking technologies to connect to the network 220. The tablet device 260 may execute a media client, messaging client, web browser, or other local application to access the multiway media relay system 210.

The same user may own and operate a personal computer device 280. The personal computer device 280 may comprise a Mac OS® device, Windows® device, Linux® device, or any other computer device running another operating system. The personal computer device 280 may be an Ethernet device capable of connecting to a network 220 via an Ethernet connection. In some embodiments and in some cases the personal computer device 280 may additionally or alternatively use cellular, Wi-Fi, or other networking technologies to the network 220. The personal computer device 280 may execute a media client, messaging client, web browser 270, or other local application to access the multiway media relay system 210.

A media client may be a dedicated media client. A dedicated media client may be specifically associated with a media call provider administering the media platform including the multiway media relay system 210. A dedicated media client may be a general client operative to work with a plurality of different media providers including the media provider administering the media platform including the multiway media relay system 210.

The messaging client may be a component of an application providing additional functionality. For example, a social networking service may provide a social networking application for use on a mobile device for accessing and using the social networking service. The social networking service may include messaging functionality such as may be provided by one or more elements of the multiway media relay system 210. It will be appreciated that servers for the multiway media relay system 210 may be one component of a computing device for the social networking service, with the computing device providing additional functionality of the social networking service. Similarly, the social networking application may provide media functionality, messaging functionality, and/or additional social networking functionality.

A user may save and retrieve data from a plurality of devices, including the smartphone device 250, tablet device 260, and personal computer device 280. The user may use a first messaging application on the smartphone device 250, a second messaging application on the tablet device 260, and the web browser 270 on the personal computer device 280. The first and second messaging applications may comprise installations of the same application on both devices. The first and second messaging applications may comprise a smartphone-specific and a tablet-specific version of a common application. The first and second messaging application may comprise distinct applications.

Figure 3:
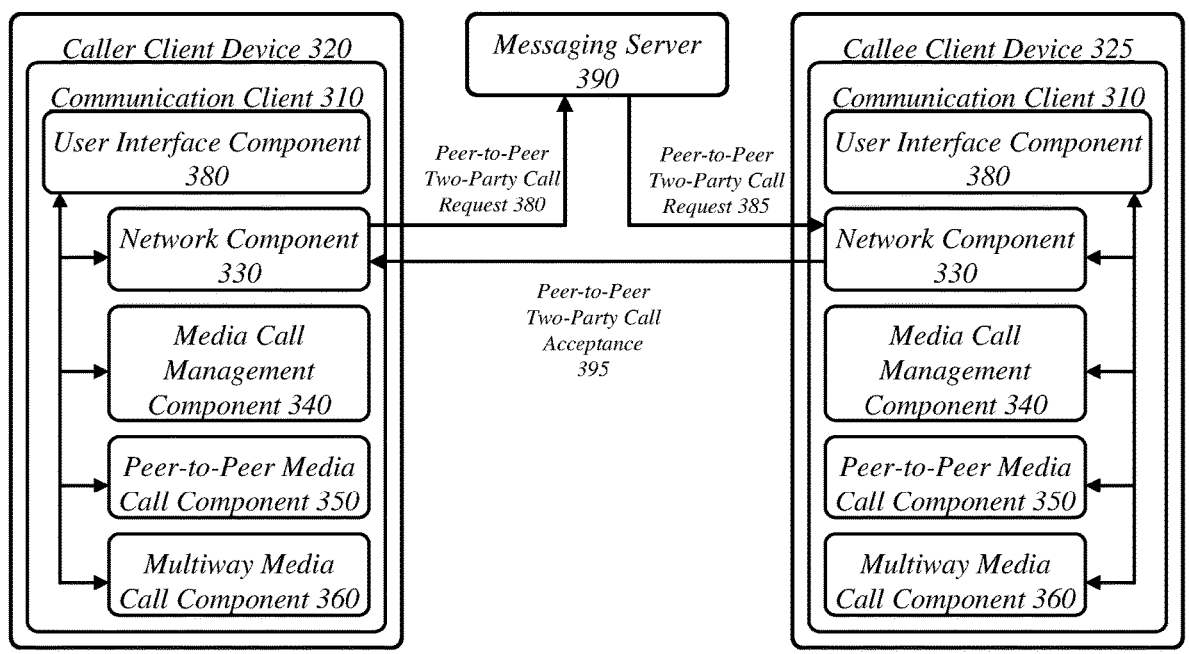
FIG. 3 illustrates an embodiment of initiating a P2P two-party call.

FIG. 3 illustrates an embodiment of initiating a P2P two-party call. A user at caller client device 320 may initiate a P2P two-party call. The P2P two-party call may be initiated using a call initiate user interface generated by user interface component 380. The call initiate user interface may include an "add participant" button which, when selected, will modify the call initiate user interface to allow the addition of additional participants to the multiway call.

The call initiate user interface, may be, for example, a list of contacts wherein choosing one of the contacts will initiate the P2P two-party call. Alternatively, user interface component 380 may generate a user interface similar to the user interface of a telephone or videoconferencing application wherein the callee may be identified by name, number, email address or other information. In another embodiment, the user of caller client device 320 may enter identifying information regarding the callee client device 325, for example, the callee client device phone number or an email address associated with the user of the callee client device 320. In yet another embodiment, the interface of the actual telephone or videoconferencing application on caller client device 320 may be used. The selection of the "add participant" user control may cause the user interface to allow the user to add a participant in a manner similar to the selection of the initial callee.

Media call management component 340 may generate a P2P two-party call request 380 and may forward the request to messaging server 390 via network component 330. Preferably, P2P two-party call request 380 will include a flag indicating whether escalation from P2P call mode to multiway call mode is supported by caller client device 320. In some embodiments, P2P two-party call request 380 generated by caller client device 320 may also include a multiway call identifier generated by the caller client device 320.

Upon receiving P2P two-party call request 380, messaging server 390 will allocate a messenger call. In some embodiments, in which P2P two-party call request 380 does not include a multiway call identifier, messaging server 390 may generate and associate a multiway call identifier with the call. Messaging server 390 may then forward the P2P two-party call request 385 to the media call management component 340 of callee client device 325. Preferably, the two-party call request 385 will include both the flag indicating the capability of caller client device 320 to escalate from P2P call mode to multiway call mode and the multiway call identifier generated by messaging server 390 or included with the initial P2P two-party call request 380 from caller client device 320.

Callee client device 325 may receive the P2P two-party call request 385 via network component 330 and forward it to media call management component 340. User interface component 380 may generate an incoming call user interface to be displayed on callee client device 325, including an audio or tactile indication of the incoming call. In response, the user of callee device 325 may accept the call.

Once the call has been accepted by the user of callee client device 325, user interface component 380 will transition to an in-call two-party user interface. In some embodiments, the in-call user two-party user interface may include a video rendering of the user of caller client device 320 and, optionally, may include a smaller video rendering of the user of callee client device 325. Video renderings of the users of each device may be obtained by respective P2*P media* call components 340 using a built-in camera device of the respective caller and callee client devices. If P2P two-party call request 385 indicates that caller client device supports escalating from P2P call mode to multiway call mode, and if callee client device 325 also supports escalating from P2P call mode to multiway call mode, user interface component 380 may include, with the in-call two-party user interface, a user control which, when selected, will allow escalation of the call from P2P call mode to multiway call mode.

After acceptance of the call by the user of callee client device 325, a P2P two-party call acceptance 395 will be sent from media call management component 340 of callee client device 325 to the media call management component 340 of caller client device 320. The P2P two-party call acceptance 395 may include a flag indicating whether callee client device 325 is capable of supporting escalation from P2P call mode to multiway call mode, and, preferably, will include the multiway call identifier. Upon receiving the P2P two-party call acceptance 395, user interface component 380 of caller client device 320 will transition the user interface from the call initiation user interface to an in-call two-party user interface, which may include a video rendering of the user of callee client device 325, and, optionally, may also include a smaller video rendering of the user of caller client device 320. P2P media call component 350 of caller client device 320 and callee client device 325 respectively will conduct the P2P two-party media call, exchanging signals and media between caller client device 320 and callee client device 325.

Additionally, if P2P two-party acceptance 395 includes a flag indicating that the callee client device 325 is capable of escalating from P2P call mode to multiway call mode, and, if caller client device 320 also supports escalation from P2P call mode to multiway call mode, then the in-call two-party user interface generated by user interface component 380 of caller client device 320 may include a user control which, when selected, will allow the escalation of the call from P2P call mode to multiway call mode.

If either the caller client device 320 or the callee client device 325 are legacy devices, that is, devices not supporting escalation from P2P call mode to multiway call mode, the user control in the in-call two-party user interface generated by the respective user interface component 380 on both the caller client device 320 and callee client device 325 will not display, or will display but disable, the user control which allows escalation from P2P call mode to multiway call mode.

Figure 4:
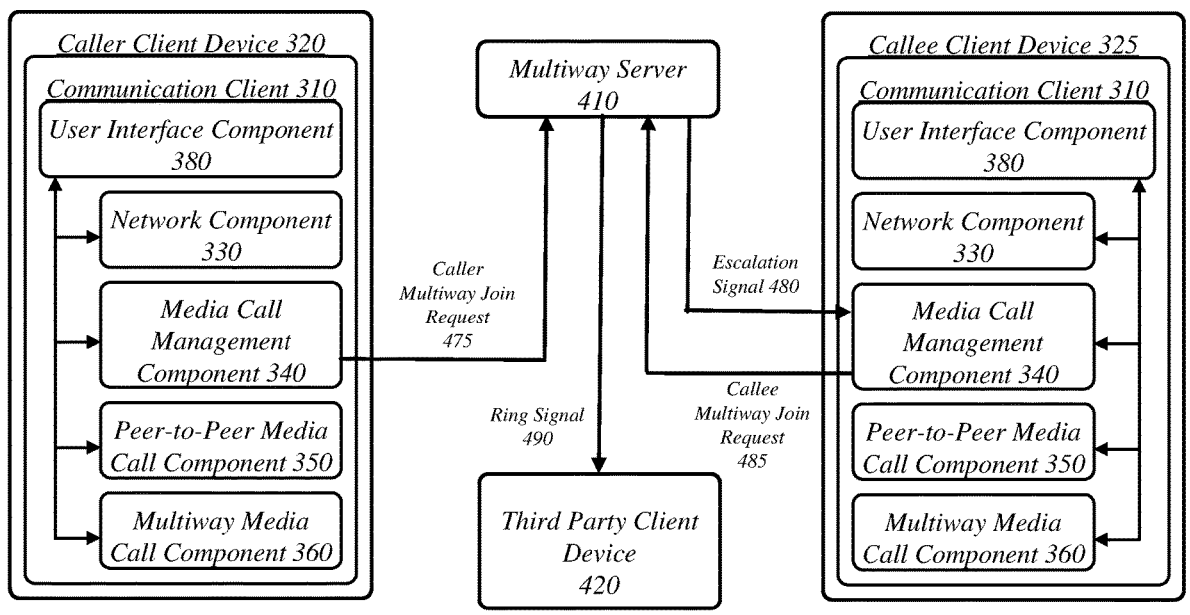
FIG. 4 illustrates an embodiment of escalating a call initiated in P2P call mode to a multiway mode call after the call has been answered and established in P2P mode.

FIG. 4 illustrates an embodiment of escalating a call initiated in P2P call mode to a multiway mode call after the call has been answered and established in P2P mode. In this embodiment, a P2P two-party call is initiated in a manner identical to the process described with reference to FIG. 3. Once the P2P two-party call has been established, either caller client device 320 or callee client device 325 may initiate an escalation to multiway call mode by a selection of the user control in the in-call two-party user interface generated by user interface component 380. For purposes of explanation, we will assume that the caller client device 320, shown in FIG. 4, has initiated the escalation to multiway call mode by a selection of the user control in the in-call two-party user interface.

Once the user control has been selected, user interface component 380 on caller device 320 may transition the in-call two-party user interface to an in-call multiway user interface. Alternatively, the in-call two-party user interface and the in-call multiway user interface may be one and the same. Typically, the in-call multiway user interface may have video renderings of all or a portion of the participants in the multiway call displayed in the in-call multiway user interface. In some embodiments, where the display of the device is insufficiently large to display video renderings of all participants, video renderings of the most recent participants to speak may be displayed, with the remainder of the participants listed or otherwise shown by an icon.

Upon selection of the user control, the media call management component 340 of caller client device 320 may send a multiway join request 475 to multiway server 410. Preferably, the multiway join request 475 will include at least an indicator of a third-party client device which the user wishes to add to the multiway call. In addition, the multiway join request 475 may also include an identifier of the other original participant in the P2P call, and namely, in this case, callee device 325.

Upon receiving the multiway join request 475 from caller client device 320, multiway server 410 may send a ring signal 490 to the device of the user to be added to the multiway call, in this case, third party client device 420. It should be noted that multiway server 410 may make a determination, prior to sending ring signal 490, that third party client device 420 is a legacy device, in which case, the ring signal 490 will not be sent.

Additionally, multiway server 410 will send an escalation signal 480 to the other participant in the P2P two-party call, in this case, callee device 325. Preferably, the escalation signal 480 will include at least the multiway call identifier of the P2P two-party call and an identifier identifying the caller that has generated the escalation signal, in this case, caller client device 320.

Upon receipt of the escalation signal 480, callee device 325 will verify that the multiway caller identifier included in the escalation signal 480 matches an ongoing P2P two-party call in which callee client device 325 is currently engaged. User interface component 380 of callee client device 325 will transition the user interface to an in-call multiway user interface identical to or similar to the one being displayed at caller client device 320 (depending on whether or not the client devices are using the same communication client 310). Callee client device 325 will then send a multiway join request 485 to multiway server 410. Preferably multiway join request 485 will include at least the multiway call identifier that callee client device 325 wishes to join. The multiway call is thereafter conducted via the multiway media call component 360 in the communication client 310 on each participant in the multiway call. Multiway server 410 may serve as a relay to relay both control signals and media, including both audio and video for the multiway call to and from each participant in the call.

In certain situations, a race condition can develop wherein both the caller client device 320 and the callee client device 325 both request escalation of the P2P call to a multiway call. In such instances, for example, if the caller client device 320 receives an escalation signal from the callee client device 325 subsequent to having detected the selection of the user control, the escalation signal from the callee client device 325 may be discarded, and the P2P call escalated to a multiway call based upon the user selection of the user control on the caller client device 320.

Figure 5:
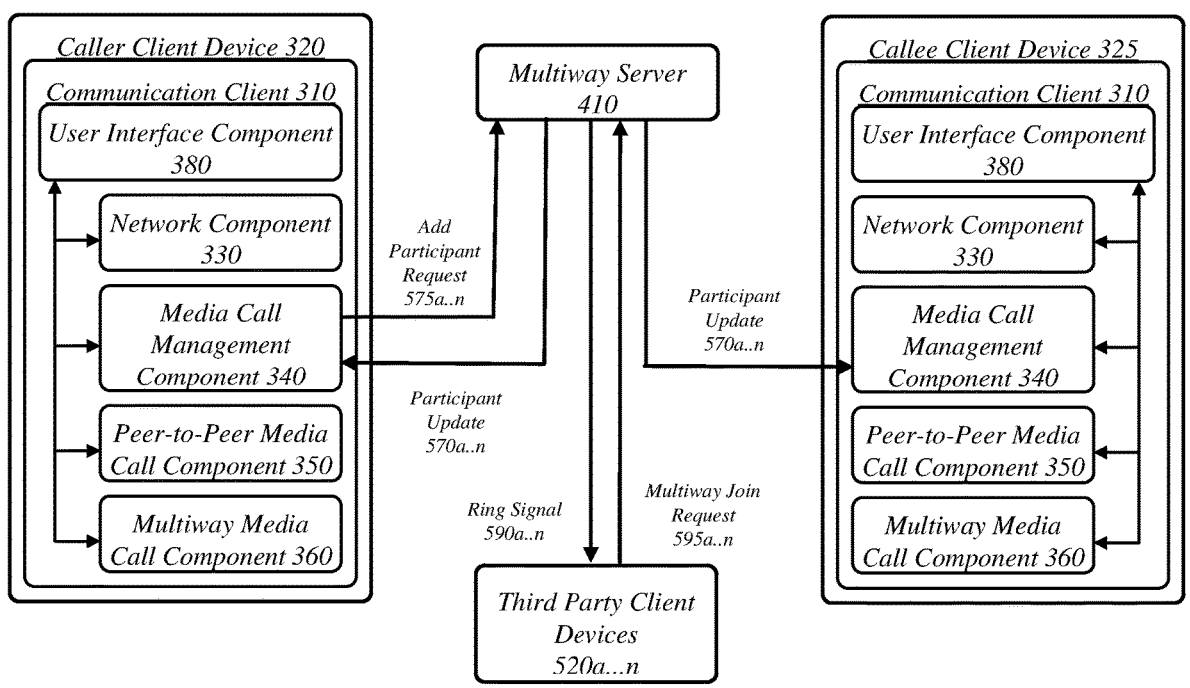
FIG. 5 illustrates an embodiment of transitioning a call initiated in P2P call mode to a multiway call before the P2P call has been answered and established in P2P mode

FIG. 5 illustrates an embodiment of transitioning from a P2P mode call to a multiway mode call before the call has been answered and established in P2P mode. In other words, the caller client device 320 attempts to add additional participants to the call before the initial callee client device 325 has accepted the P2P call by responding to the audio or tactile signal indicating an incoming call.

In this embodiment, as in previous embodiments, a P2P two-way call is initiated by the caller client device 320 to the callee client device 325 in a manner identical to the process described with reference to FIG. 3. In this embodiment, however, before the callee client device 325 answers the call, caller client device 320 adds additional participants. The user of caller client device 320 may add additional participants by selecting a user control from a call initiate user interface generated by user interface component 380. As described with respect to the embodiment of FIG. 3, the call initiate interface may provide a means to specify or select additional participants, as by entering identifying information of the desired client device or by selecting the additional participants from a list of contacts.

Initially, the embodiment in which additional participants are added prior to acceptance of the call by the first callee client device 325 proceeds identically to the process shown in FIG. 4. When the first additional participant is added by the user of caller client device 320, media call management component 340 will escalate the call to a multiway call and will issue a multiway join request 470 to multiway server 410, specifying the name of the callee device 325 and the additional third party client device that the user wishes to add to the multiway call, as shown in FIG. 4. Callee client device 325 will then receive an escalation signal 480 from multiway server 410, indicating that the call that was initiated in P2P mode has been escalated to a multiway mode call. Upon receiving escalation signal 480, the media call management component 340 of callee client device 325 will escalate to a multiway call mode. Note at this point the user of callee client device 325 still has not accepted the call.

Now, with reference to FIG. 5, caller client device 320 may add additional participants by issuing an add participant request 575 to multiway server 410, as shown in FIG. 5. Preferably, the add participant request 575 will specify the third-party client device 520 that the user of caller client device 320 wishes to add to the multiway call. Upon receiving the add participant request, multiway server 410 will issue a ring signal 590 to the specified third-party client device 520 and, if the third party device wishes to join the multiway call, will receive a multiway join request 595 in response. The user of caller client device 320 may continue to add additional users in the same manner. When third-party client device 520 has accepted the call, third-party client device 520 will issue a multiway join request to multiway server 410. In response, multiway server 410 will issue a participant update 570 to each of caller client device 320, callee client device 325, and any other third-party client devices 520 that have already accepted and are current participants in the multiway call. Once all participants have joined the multiway call, the media call management component 340 of each participant will transfer control to multiway call component 360 of each participant to conduct the multiway call, using the multiway server 410 or another relay server to relay signals and media to and from each participant in the call.

If the user of caller client device 320 specifies legacy third-party client device 520 to add to the multiway call, multiway server 410 is capable of detecting that third-party client device 520 is a legacy device and will not issue the ring signal 590. Additionally, initial callee client device 325 may be a legacy device, which caller client device 320 will not know because callee client device 325 has not yet sent an accept signal. If, after initiating the P2P call with callee client device 325, caller client device 320 attempts to escalate to a multiway call and add additional participants, multiway server 410 may send an abort signal to callee client device 325 to either prevent callee client device 325 from ringing or, if callee client device 325 has already started to ring, to abort the ringing.

Included herein is a set of flow charts representative of exemplary methodologies for performing novel aspects of the disclosed architecture. For purposes of simplicity of explanation, the one or more methodologies are shown herein in the form of a flow chart or flow diagram describing as a series of acts. It is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates an embodiment of a logic flow 600 for a client device in accordance with the claimed embodiments. The logic flow 600 may be representative of some or all of the operations executed by one or more embodiments described herein.

In the illustrated embodiment shown in FIG. 6, at block 602 of logic flow 600, a first client device initiates a P2P two-party media call with a second client device by having media call management component 340 of communication client 310 send an P2P two-party call request 380 to a messaging server 390. In a preferred embodiment, the messaging server creates a multiway call identifier and forwards the two-party call request 385 to the second client device which includes the multiway call identifier. In alternate embodiments, the caller client device 320 may generate the multiway call identifier and include it with the two-party call request 380. The second client device accepts the call by sending an P2P two-party call acceptance 395 to the first client device, including the multiway call identifier.

At block 602, the two-party media call is conducted between the first client device and the second client device in P2P mode. The two-party media call may include both audio and video or may comprise only audio. The P2P media call is conducted by P2P media call component 350 of communication client 310. In some embodiments, the two-party media call may be conducted by having the P2P media call component 350 of each participant interface with a relay server, which may be the same or separate from messaging server 390.

At block 606, a multiway media call escalation event is detected on the first client device. The escalation event may result from a user selection of a user control in an in-call two-party user interface of a communication client 310 installed on the client device. In alternate embodiments, the user control may take different forms. For example, in one embodiment a user control may be an "add participant" button which allows a user of the first client device to add additional participants to the call by identifying them by phone number, email address or other information, or by selecting them from a list of contacts on the first client device. The user interface of the first client device is managed by the user interface component 380 of communication client 310.

At block 608, the first client device joins a multiway media call session at a multiway server 390, which may be part of a multiway media relay system 210 by having the media call management component 340 send a multiway join request 475 to a multiway server 390. The multiway media call session is identified in the multiway call join request 475 by the multiway call identifier received in the P2P two-party call acceptance 395 received from the second client device during the P2P call initiation process.

At block 610, the first client device is escalated from a P2P call mode to a multiway call mode by media call management component 340. This step may include transferring control of the call from P2P media call component 350 to multiway media call component 360, by ceasing communication with messaging server 390, and by initiating communication with multiway server 410. Additionally, user interface component 380 of communication client 310 may transition the user interface of the device from an in-call two-party call interface to an in-call multiway call interface, as described previously.

The embodiments of a communication client 310 operative on a client device are not limited to this example.

FIG. 7 illustrates an embodiment of a logic flow 700 for a server device in accordance with the claimed embodiments. The logic flow 700 may be representative of some or all of the operations executed by one or more embodiments described herein.

In the illustrated embodiment shown in FIG. 7, the logic flow 700, at block 702 receives, at a server, a P2P two-party request 380 from a first client device requesting initiation of a P2P connection with the second client device. In some embodiments, the server will allocate a multiway call identifier, which will be forwarded with the P2P two-party request 350 to the second client device. In other embodiments, the multiway call identifier may be generated by the first client device and included in the P2P two-party request 380. From the perspective of the server, it is assumed that the call between the first and second client devices is conducted in P2P mode, independent of the server, or, in some embodiments, with the aid of a relay server, which may or may not be part of the messaging server of logic flow 700.

At block 704, the server receives a multiway join request 475 from a client device indicating that the call is to be escalated to a multiway call. The multiway join request 475 may be received from either the first client device or the second client device. The multiway join request 475 will preferably include the multiway call identifier established during the initiation of the P2P call.

At block 706 the server sends an escalation signal 480 to the other client device, that is, the escalation signal 480 is sent to the client device which did not request the escalation. In response, the server receives a multiway join request 485 from the client device to which the escalation signal was sent. At this point, a multiway call has been established between the first client device and the second client device. The server acts to relay both signals and media between the first client device and the second client device.

At block 708, the server receives an add participant request 575 from one or the other of the first or second client devices, identifying a third-party client device that the participants wish to add to the multiway call. In response, the server sends a ring signal 590 to the third-party client device and, if the call is accepted, will receive a multiway join request 595 from the third-party client device, indicating that the third-party client device agrees to take part in the multiway call.

At block 710, a participant update signal is sent to the first client device and the second client device, indicating that the third-party client device has joined the multiway call. The participant update signal will preferably include an identifier of the third-party client device. It should be noted that blocks 708 and 710 may be repeated multiple times to add additional, multiple participants to the multiway call.

At block 712, the server acts to relay both signals and media between all participants in the multiway call.

It should be noted that multiway media relay system 210 comprises both messaging server 390 and multiway server 410 and, in some embodiments, may also include a relay server. In some embodiments messaging server 390, shown in FIG. 3, may be separate from multiway server 410, shown in FIG. 4. In other embodiments, messaging server 390 and multiway server 410, as well as any relay servers, may be embodied in the same device. The embodiments of a multiway media relay system 210 are not limited to these examples.

Figure 8:
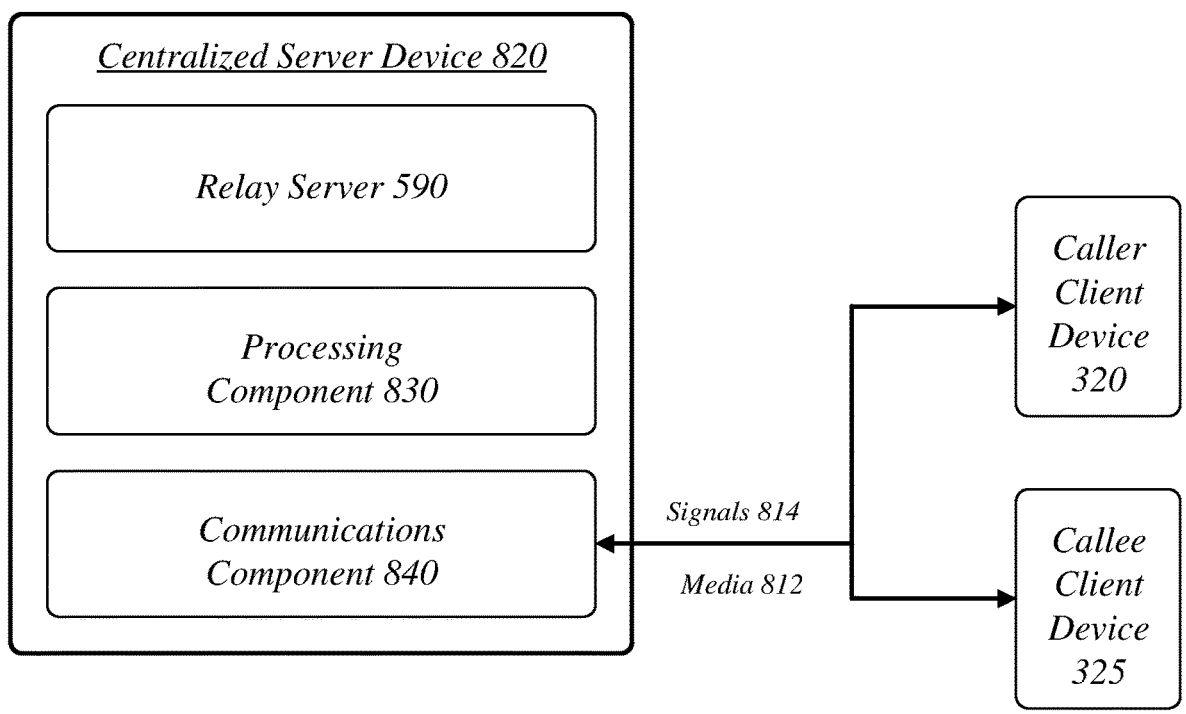
FIG. 8 illustrates an embodiment of a centralized system for the system of FIG. 1.

FIG. 8 illustrates a block diagram of a centralized system 800. The centralized system 800 may implement some or all of the structure and/or operations for the media call system 100 in a single computing entity, such as entirely within a single centralized server device 810.

The centralized server device 820 may comprise any electronic device capable of receiving, processing, and sending information for the media call system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 820 may execute processing operations or logic for the media call system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 820 may execute communications operations or logic for the media call system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 820 may communicate with other devices over a communications media 812 using communications signals 814 via the communications component 840. The centralized server device 820 may execute a relay server 590, the relay server 590 operative to assist in the performance of streaming media connections. The relay server 590 may receive and forward network packets between the caller client device 320 and callee client device 325 as assistance to the performance of a streaming media connection, the receiving and forwarding of network packets comprising at least a portion of the signals 814 transmitted via media 812.

Figure 9:
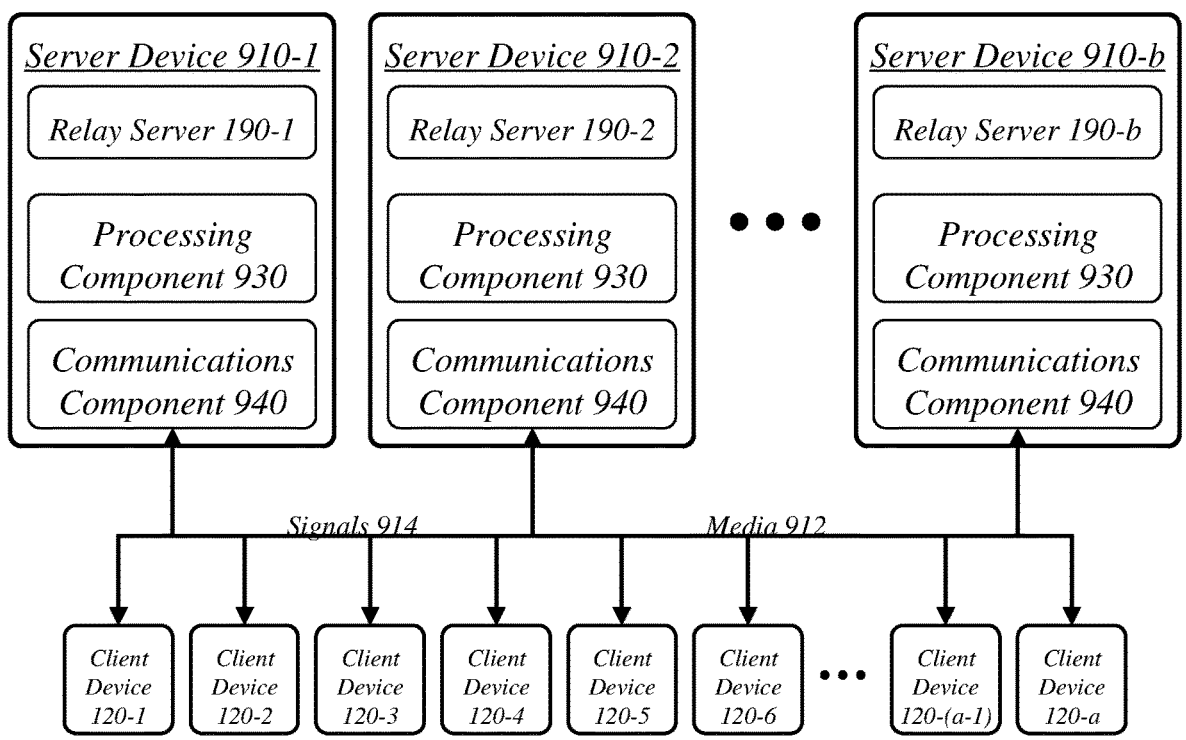
FIG. 9 illustrates an embodiment of a distributed system for the system of FIG. 1.

FIG. 9 illustrates a block diagram of a distributed system 900. The distributed system 900 may distribute portions of the structure and/or operations for the media call system 100 across multiple computing entities. Examples of distributed system 900 may include without limitation a client-server architecture, a 3-tier architecture, an N-tier architecture, a tightly-coupled or clustered architecture, a P2P architecture, a master-slave architecture, a shared database architecture, and other types of distributed systems. The embodiments are not limited in this context.

The distributed system 900 may comprise a plurality of server devices 910. In general, the server devices 910 may be the same or similar to the centralized server device 820 as described with reference to FIG. 8. For instance, the server devices 910 may each comprise a processing component 930 and a communications component 940 which are the same or similar to the processing component 830 and the communications component 840, respectively, as described with reference to FIG. 8. In another example, the server devices 910 may communicate over a communications media 912 using communications signals 914 via the communications components 940.

The server devices 910 may comprise or employ one or more programs that operate to perform various methodologies in accordance with the described embodiments. In one embodiment, for example, the server devices 910 may each implement a relay server of a plurality of relay servers 190, as described with reference to FIG. 1.

Figure 10:
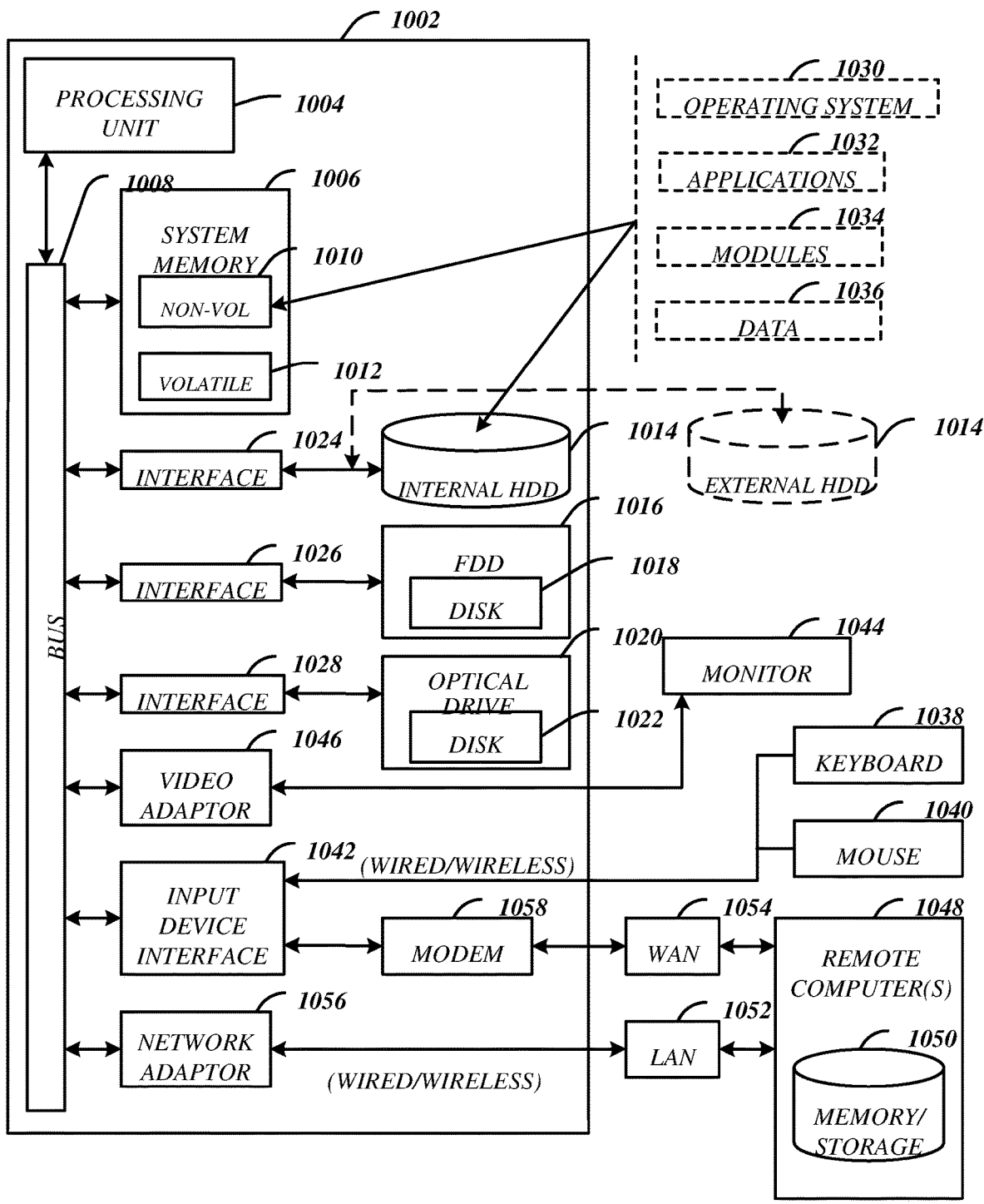
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIGS. 8 and 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the media call system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
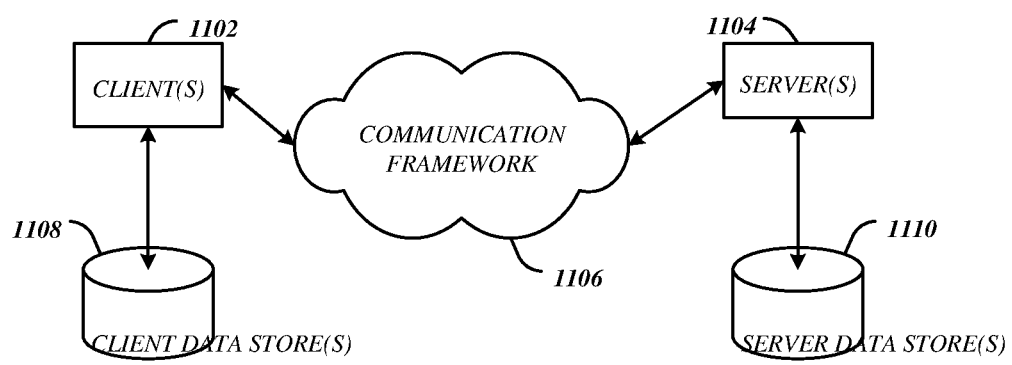
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may correspond to the clients devices 120. The servers 1104 may correspond to the relay servers 190 and other servers. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
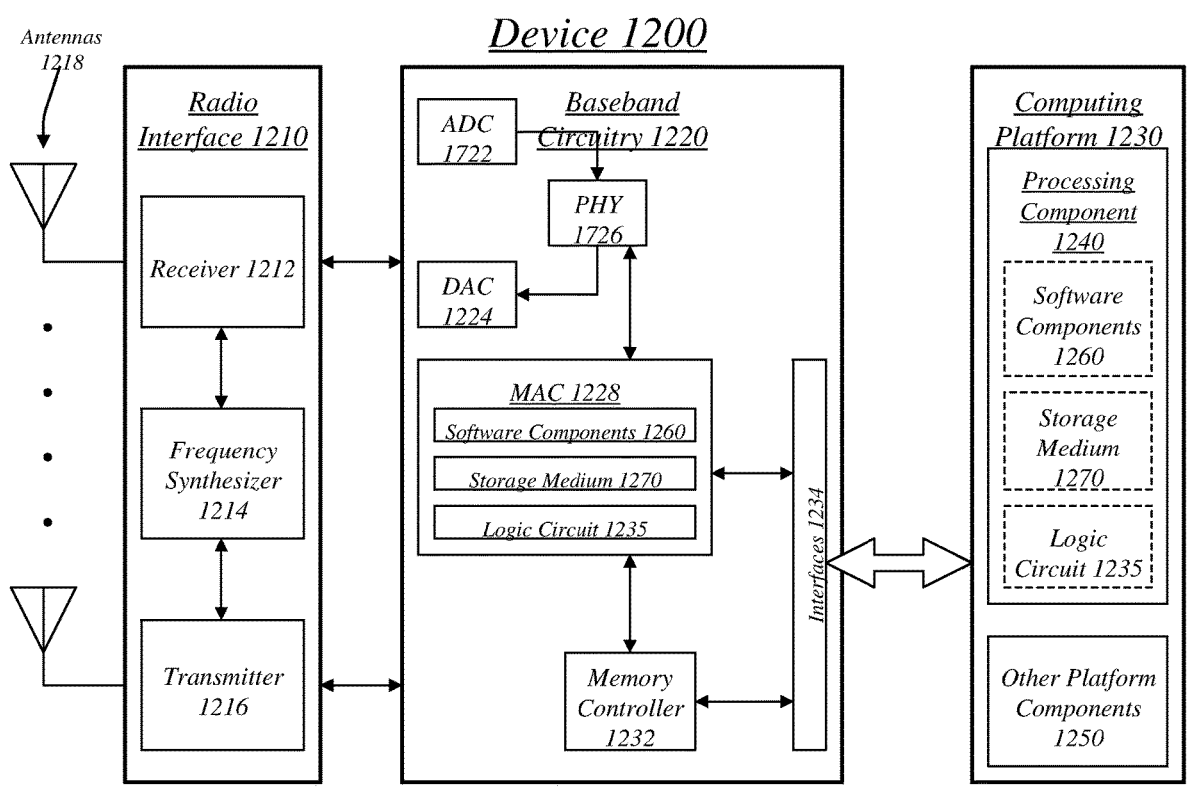
FIG. 12 illustrates an embodiment of a radio device architecture.

FIG. 12 illustrates an embodiment of a device 1200 for use in a multicarrier OFDM system, such as the media call system 100. Device 1200 may implement, for example, software components 1260 as described with reference to media call system 100 and/or a logic circuit 1235. The logic circuit 1235 may include physical circuits to perform operations described for the media call system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the media call system 100 and/or logic circuit 1235 in a single computing entity, such as entirely within a single device. Alternatively, the device 1200 may distribute portions of the structure and/or operations for the media call system 100 and/or logic circuit 1235 across multiple computing entities using a distributed system architecture, such as a client-server architecture, a 3-tier architecture, an N-tier architecture, a tightly-coupled or clustered architecture, a P2P architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the media call system 100 and logic circuit 1235 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
    initiating, by a first client device, a peer-to-peer two-party media call with a second client device by sending a peer-to-peer two-party call request to a messaging server, wherein the peer-to-peer two-party call request is sent by the messaging server to the second client device and includes a multiway call identifier for connecting the first client device, the second client device, and a third client device to a multiway media call session by a multiway server;
    performing the peer-to-peer two-party media call with the second client device;
    detecting a multiway media call escalation event at the first client device;
    initiating, by the first client device, the multiway media call session by sending a multiway join request to the multiway server, wherein a first escalation signal is sent by the multiway server to the second client device and includes the multiway call identifier;
    joining the multiway media call session; and
    transitioning the first client device from the peer-to-peer two-party media call to the multiway media call session.

2. The method of claim 1, wherein the multiway join request includes at least an indicator for identifying the third client device and an identifier for identifying the second client device.

3. The method of claim 1, wherein the second client device receives the first escalation signal and verifies that the multiway call identifier included in the first escalation signal matches the ongoing peer-to-peer two-party media call in which the second client device is engaged.

4. The method of claim 1, the multiway media call escalation event comprising a user addition control selection on the first client device, the method further comprising:
    sending a multiway media call invitation to the third client device in response to the user addition control selection.

5. The method of claim 4, further comprising:
    determining a second escalation signal is received at the first client device from the multiway server subsequent to the detecting of the user addition control selection on the first client device, the second escalation signal indicating a request by the second client device to escalate the peer-to-peer two-party call to the multiway media call session; and
    discarding the second escalation signal based on the determining.

6. The method of claim 4, further comprising:
    receiving, at the first client device, an indication that the second client device is capable of joining the multiway media call session while initiating the peer-to-peer two-party media call; and
    displaying a user addition control in association with a media call interface on the first client device in response to receiving the indication at the first client device, the user addition control selection received in association with the user addition control.

7. An apparatus, comprising:
    a memory; and
    at least one processor, coupled with the memory, to execute stored instructions to:
    initiate a peer-to-peer two-party media call with a second client device by sending a peer-to-peer two-party call request to a messaging server, wherein the peer-to-peer two-party call request is sent by the messaging server to the second client device and includes a multiway call identifier for connecting the first client device, the second client device, and a third client device to a multiway media call session by a multiway server;
    perform the peer-to-peer two-party media call with the second client device;
    detect a multiway media call escalation event;
    initiate the multiway media call session by sending a multiway join request to the multiway server, wherein a first escalation signal is sent by the multiway server to the second client device and includes the multiway call identifier;
    join the multiway media call session; and
    transition from the peer-to-peer two-party media call to the multiway media call session.

8. The apparatus of claim 7, wherein the apparatus is a first client device, wherein the multiway media call escalation event comprising a user addition control selection wherein the at least one processor is caused to:
    send a multiway media call invitation to the third client device in response to the user addition control selection.

9. The apparatus of claim 8, wherein the at least one processor is further caused to:
    determine that a second escalation signal is received from the multiway server subsequent to the detecting of the user addition control selection on the first client device, the second escalation signal indicating a request by the second client device to escalate the peer-to-peer two-party call to the multiway media call session; and
    discarding the second escalation signal based on the determination.

10. The apparatus of claim 8, further comprising:
receiving, at the first client device, an indication that the second client device is capable of joining the multiway media call session while initiating the peer-to-peer two-party media call; and
displaying a user addition control in association with a media call interface on the first client device in response to receiving the indication at the first client device, the user addition control selection received in association with the user addition control.

11. At least non-transitory one computer-readable storage medium comprising instructions that, when executed, cause a system to:
initiate, by a first client device, a peer-to-peer two-party media call with a second client device by sending a peer-to-peer two-party call request to a messaging server, wherein the peer-to-peer two-party call request is sent by the messaging server to the second client device and includes a multiway call identifier for connecting the first client device, the second client device, and a third client device to a multiway media call session by a multiway server;
perform the peer-to-peer two-party media call with the second client device;
detect a multiway media call escalation event at the first client device;
initiate, by the first client device, the multiway media call session by sending a multiway join request to the multiway server, wherein a first escalation signal is sent by the multiway server to the second client device and includes the multiway call identifier;
join the multiway media call session; and
transition the first client device from the peer-to-peer two-party media call to the multiway media call session.

12. The computer-readable storage medium of claim 11, the multiway media call escalation event comprising a user addition control selection on the first client device, comprising further instructions that, when executed, cause a system to:
send a multiway media call invitation to a third client device in response to the user addition control selection.

13. The computer-readable storage medium of claim 12, comprising further instructions that, when executed, cause a system to:
receive, at the first client device, an indication that the second client device is capable of joining the multiway media call session while initiating the peer-to-peer two-party media call; and
display a user addition control in association with a media call interface on the first client device in response to receiving the indication at the first client device, the user addition control selection received in association with the user addition control.

* * * * *